(12) United States Patent
Nozaki et al.

(10) Patent No.: US 11,794,824 B2
(45) Date of Patent: Oct. 24, 2023

(54) VEHICLE AIR GUIDE PATH STRUCTURE AND AIR GUIDE PATH FORMING MEMBER

(71) Applicants: SUBARU CORPORATION, Tokyo (JP); TOYOTA JIDOSHA KABUSHIKI KAISHA, Toyota (JP)

(72) Inventors: Ryuji Nozaki, Tokyo (JP); Kazuyuki Kotsuka, Tokyo (JP); Hideki Hata, Tokyo (JP); Kenji Watanuki, Tokyo (JP); Koushi Yamada, Odawara (JP)

(73) Assignees: SUBARU CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/526,620

(22) Filed: Nov. 15, 2021

(65) Prior Publication Data

US 2022/0153358 A1 May 19, 2022

(30) Foreign Application Priority Data

Nov. 17, 2020 (JP) ................ 2020-190674

(51) Int. Cl.
*B62D 35/00* (2006.01)
*B62D 35/02* (2006.01)

(52) U.S. Cl.
CPC .......... *B62D 35/008* (2013.01); *B62D 35/02* (2013.01)

(58) Field of Classification Search
CPC ........ B60R 13/04; B62D 25/02; B62D 25/16; B62D 25/161; B62D 35/00; B62D 35/005; B62D 35/008

(Continued)

(56) References Cited

U.S. PATENT DOCUMENTS

| 9,821,860 | B2 * | 11/2017 | Haas ................ B62D 25/16 |
| 2014/0378043 | A1 | 12/2014 | Mueller et al. |

(Continued)

FOREIGN PATENT DOCUMENTS

| DE | 10047731 A1 * | 4/2002 | .......... B62D 35/008 |
| DE | 10213188 A1 * | 10/2003 | .......... B62D 35/008 |

(Continued)

OTHER PUBLICATIONS

Japanese Office Action dated Sep. 13, 2022, in corresponding Japanese Patent Application No. 2020-190674, with an English translation thereof.

(Continued)

*Primary Examiner* — Jason S Daniels
(74) *Attorney, Agent, or Firm* — McGinn IP Law Group, PLLC

(57) ABSTRACT

In a vehicle air guide path structure, a vertically long air guide path forming member is provided along an outer edge of a side surface portion of a vehicle body on a rear side of a wheel house. A vertically long air guide path is formed at the rear side of the wheel house. The vertically long air guide path suctions air from the wheel house and exhausts air along a side surface of the vehicle body. A partition member partitions the vertically long air guide path so as to form a plurality of sections in an upper-lower direction. A vertically long inclined surface is formed on the side surface portion of the vehicle body at a rear side of the vertically long air guide path. The partition member protrudes to a rear side from the vertically long air guide path.

20 Claims, 5 Drawing Sheets

(58) Field of Classification Search
USPC .............. 296/180.1, 181.5, 193.05, 198, 208
See application file for complete search history.

(56) References Cited

U.S. PATENT DOCUMENTS

| | | |
|---|---|---|
| 2016/0075383 A1 | 3/2016 | Haas et al. |
| 2018/0086394 A1* | 3/2018 | Dunford ................ B62D 35/00 |
| 2022/0135149 A1* | 5/2022 | Nei ........................ B62D 35/00 296/203.03 |

FOREIGN PATENT DOCUMENTS

| | | | |
|---|---|---|---|
| DE | 10 2013 209 867 A | 12/2014 | |
| FR | 2897833 A3 * | 8/2007 | ............. B62D 25/16 |
| JP | S 60-110178 U | 7/1985 | |
| JP | S 62-023875 A | 1/1987 | |
| JP | 2001-278123 A | 10/2001 | |
| JP | 2013-014283 A | 1/2013 | |
| JP | 2013-047068 A | 3/2013 | |

OTHER PUBLICATIONS

Japanese Office Action, dated Apr. 25, 2023, in Japanese Application No. 2020-190674 and English Machine Translation thereof.

* cited by examiner

VEHICLE AIR GUIDE PATH STRUCTURE AND AIR GUIDE PATH FORMING MEMBER

CROSS-REFERENCE TO RELATED APPLICATIONS

This application is based on and claims priority under 35 USC 119 from Japanese Patent Application No. 2020-190674 filed on Nov. 17, 2020, the contents of which are incorporated herein by reference.

The present disclosure relates to a vehicle air guide path structure and an air guide path forming member.

It is desired to reduce air resistance or the like during traveling in a vehicle such as an automobile.

In U.S. Patent Publication No 2016/0075383 and Japanese Unexamined Patent Application Publication No. 2001-278123, an air guide path is formed in an over-fender provided at a rear side of a wheel house or along an outer periphery of a wheel house. Such an air guide path is formed so that air that entered the wheel house is efficiently exhausted to a rear side through the air guide path. It can be expected that the air resistance during traveling can be reduced.

Even when air that entered a wheel house can be efficiently exhausted to a rear side, it is not always possible to improve other performance desired for a vehicle, for example, a situation that affects steering stability, such as wobbling or flapping of the vehicle.

As described above, it is desirable to not only reduce air resistance during traveling, but also improve other performance such as prevention of the occurrence of a situation that affects steering stability performance of the vehicle.

SUMMARY

An aspect of the disclosure provides a vehicle air guide path structure. In the vehicle air guide path structure, a vertically long air guide path forming member is provided to be vertically long along an outer edge of a side surface portion of a vehicle body of a vehicle on a rear side of a wheel house of the vehicle. A vertically long air guide path is formed by the vertically long air guide path forming member at the rear side of the wheel house. The vertically long air guide path is configured to suction air from the wheel house and exhaust air along a side surface of the vehicle body. A partition member partitions the vertically long air guide path so as to form a plurality of sections in an upper-lower direction. A vertically long inclined surface is formed on the side surface portion of the vehicle body at a rear side of the vertically long air guide path. The partition member protrudes to a rear side from the vertically long air guide path.

An aspect of the disclosure provides an air guide path forming member. The air guide path forming member is to be provided vertically long along an outer edge of a side surface portion of a vehicle body of a vehicle in a rear side of a wheel house of the vehicle. A vertically long air guide path is formed at the rear side of the wheel house. The vertically long air guide path is configured to suction air from the wheel house, and exhaust air along a side surface of the vehicle body. A partition member partitions the vertically long air guide path so as to form a plurality of sections in an upper-lower direction. A vertically long inclined surface is formed on the side surface portion of the vehicle body at a rear side of the vertically long air guide path. The partition member protrudes to a rear side from the vertically long air guide path.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DESCRIPTION OF EMBODIMENTS

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
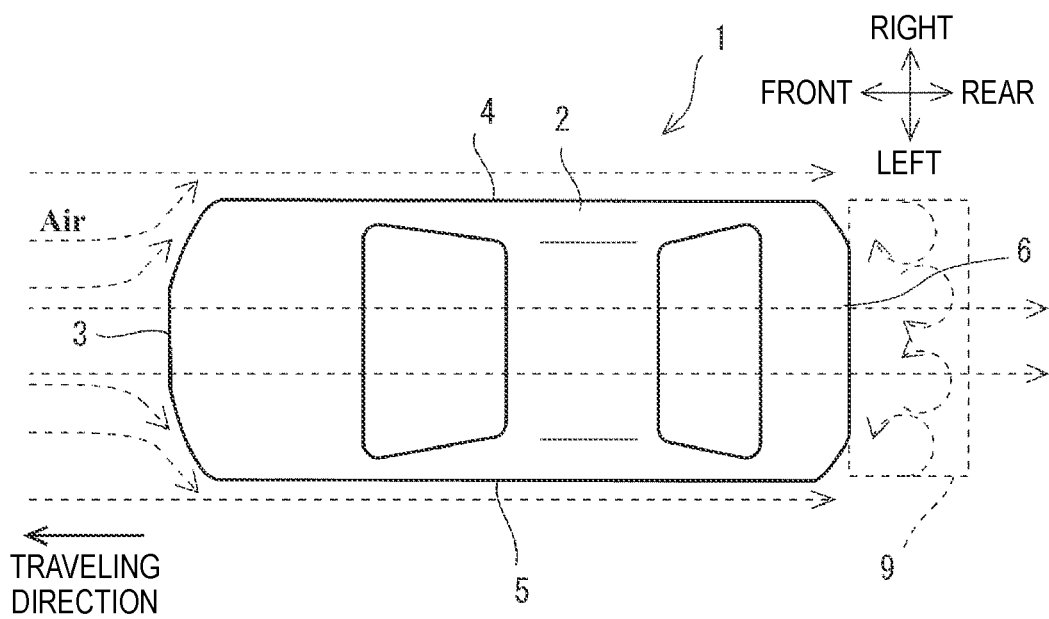
FIG. 1A is a plan view showing an automobile according to an embodiment.

FIG. 1A is a plan view showing an automobile 1 according to an embodiment of the present invention.

Figure 1B:
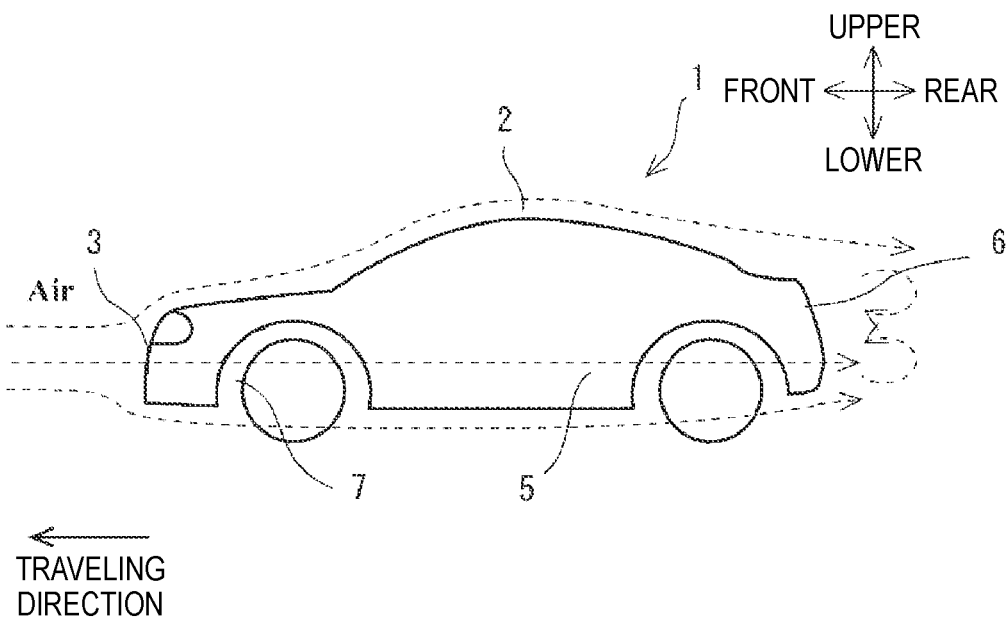
FIG. 1B is a left side view showing the automobile in FIG. 1A.

FIG. 1B is a left side view showing the automobile 1 in FIG. 1A.

The automobile 1 is an example of a vehicle.

The automobile 1 in FIGS. 1A and 1B has a vehicle body 2. The automobile 1 can travel forward or rearward by a manual operation of an occupant or by automatic driving. The automobile 1 can travel in a right front direction, a left front direction, a right rear direction, or a left rear direction by steering.

Airflows flowing along a shape of the vehicle body 2 are generated around the vehicle body 2 during traveling as indicated by dashed arrows in the drawings. Air at a traveling direction side of the vehicle body 2 hits a front surface 3 of the vehicle body 2, and then is divided toward left and right side surfaces 4 and 5 and an upper surface of the vehicle body 2 and flows along the side surfaces 4 and 5 and the upper surface of the vehicle body 2, and airflows join each other at a rear side of the vehicle body 2. A vortex flow is generated at the rear side of the vehicle body 2 due to the entrainment of airflows toward a rear surface 6 of the vehicle body 2. These airflows are one factor that hinders traveling of the automobile 1.

In the automobile 1, a corner portion or the like from a front surface portion to a side surface portion of the vehicle body 2 may be formed into a smooth curved surface shape. Since the corner portion is formed into a curved surface shape, air at the traveling direction side of the vehicle body 2 hits a front bumper face provided on the front surface 3 of the vehicle body 2, and then flows along an outer shape of the front bumper face, and airflows flowing from a front side to a rear side at outer sides of left and right sides of the vehicle body 2 can interflow with each other. Accordingly, it can be expected to reduce the air resistance during traveling.

Figure 2:
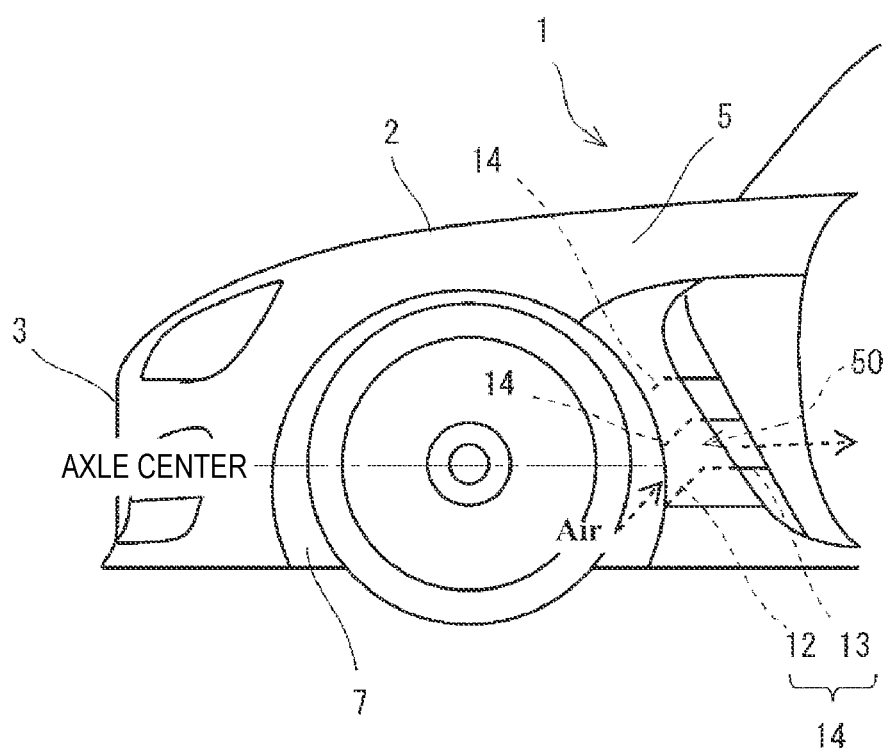
FIG. 2 is a side view showing a left front portion of the automobile in FIG. 1A.

FIG. 2 is a side view showing a left front portion of the automobile 1 in FIG. 1A.

As shown in FIG. 2, a vertically long air guide path forming member is provided at a side surface portion of the vehicle body 2 that is a rear side of a wheel house 7. A vertically long air guide path 50 is formed at the side surface portion of the vehicle body 2 that is the rear side of the wheel house 7 by the vertically long air guide path forming member. For example, the air guide path 50 suctions air in the wheel house 7, and exhausts the suctioned air to a rear side along the side surfaces 4 and 5 of the vehicle body 2.

In this manner, since the air guide path 50 is provided at the side surface portion of the vehicle body 2 that is the rear side of the wheel house 7, air that entered the wheel house 7 is efficiently exhausted to a rear side through the air guide path 50. It can be expected that air resistance during traveling can be reduced.

Even when air that entered the wheel house 7 can be efficiently exhausted to a rear side, it is not always possible to improve other performance desired for the automobile 1, for example, a situation that affects steering stability, such as wobbling or flapping of the automobile 1.

As described above, it is desired to not only reduce the air resistance during traveling, but also improve other performance such as prevention of the occurrence of a situation that affects steering stability performance of the automobile 1.

Figure 3:
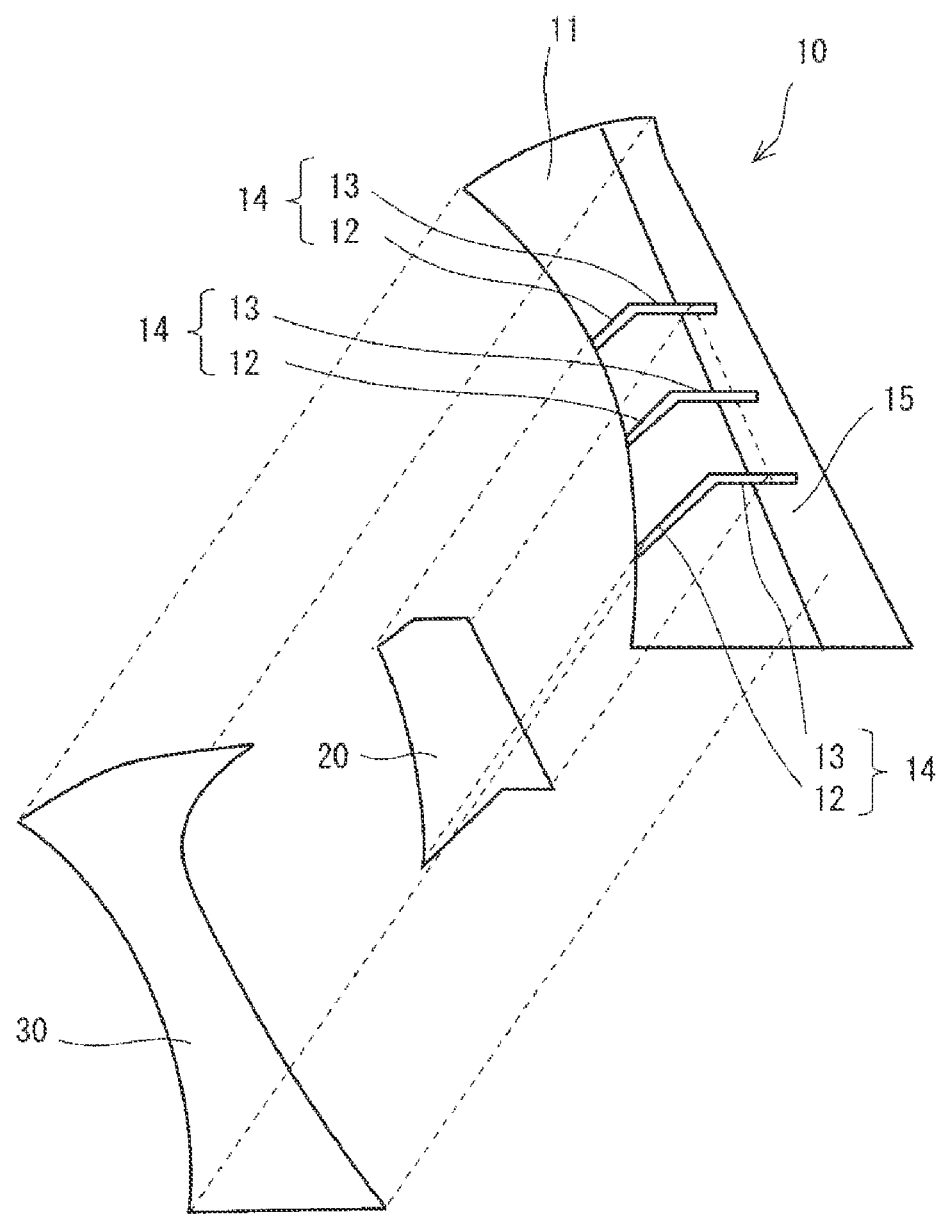
FIG. 3 is an exploded perspective view showing an air guide path structure provided in the left front portion in FIG. 1B.

FIG. 3 is an exploded perspective view showing an air guide path structure provided at the left front portion in FIG. 1B.

In FIG. 3, the air guide path forming member includes an inner member 10, an outer member 20, and a cover member 30.

An air guide path structure similar to that shown in FIG. 3 is provided at a right front portion of the vehicle body 2.

The inner member 10 is located inside the vertically long air guide path 50 in the vehicle width direction of the automobile 1.

The inner member 10 includes an inner substrate portion 11 elongated in an upper-lower direction of the vehicle body 2, a plurality of partition members 14 erected on an outer surface of the inner substrate portion 11, and a vertically long inclined surface 15.

The vertically long inclined surface 15 is formed to be vertically long at a portion of the outer surface of the inner substrate portion 11 at a rear edge side of the vehicle body 2.

The plurality of partition members 14, that is three or more of partition members 14, are erected on the outer surface of the inner substrate portion 11. The three or more partition members 14 are arranged on the outer surface of the inner substrate portion 11 in a manner of being spaced apart from one another in the upper-lower direction.

The partition member 14 has an inclined portion 12 and a flat portion 13.

The flat portion 13 is a flat plate portion that is substantially horizontal along a front-rear direction of the vehicle body 2. A rear end of the flat portion 13 is located above the vertically long inclined surface 15.

The inclined portion 12 is a flat plate portion that is lowered forward from a front edge of the flat portion 13. A surface from the inclined portion 12 to the flat portion 13 is continuously formed on the partition member 14.

The outer member 20 is located at an outer side of the vertically long air guide path 50 in the vehicle width direction of the automobile 1.

The outer member 20 has a substantially flat plate shape. The outer member 20 covers an outer surface of the inner substrate portion 11 in a manner in which the outer member 20 is in contact with tip ends of the three or more of partition members 14 erected on the outer surface of the inner substrate portion 11. Accordingly, the air guide path 50 is formed.

An outer shape of the outer member 20 may be, for example, a shape extending from an uppermost partition member 14 to a lowermost partition member 14. It is preferable to form the partition member 14 to have a width smaller than a length in the front-rear direction of the partition member 14. Accordingly, on a rear side of the outer member 20, a rear end portion of the flat portion 13 of the partition member 14 and a rear end portion of the vertically long inclined surface 15 can be exposed at a rear side of the air guide path 50.

The cover member 30 is provided in a manner of covering the outer member 20.

The cover member 30 may be formed to be vertically longer than the outer member 20. The cover member 30 is an exterior member exposed at the side surfaces 4 and 5 of the vehicle body 2.

Figure 4:
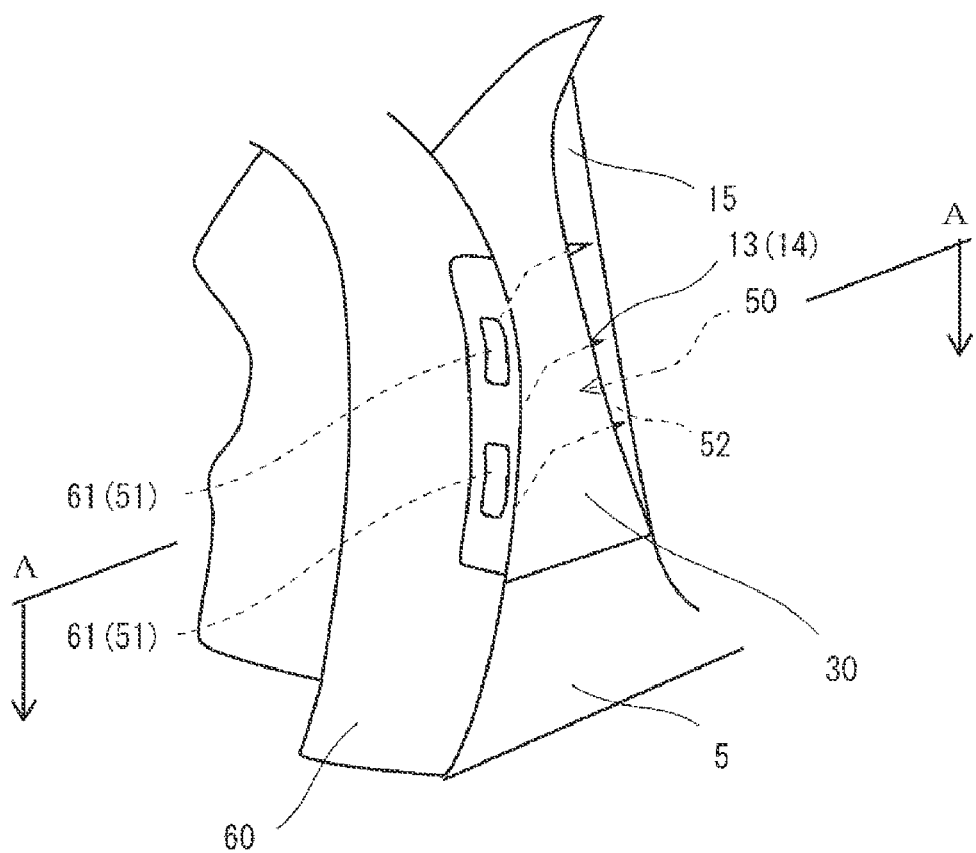
FIG. 4 is a front perspective view showing the air guide path structure provided in the left front portion of the automobile in FIG. 1B.

FIG. 4 is a front perspective view showing the air guide path structure provided at the left front portion of the automobile 1 in FIG. 1B.

Figure 5:
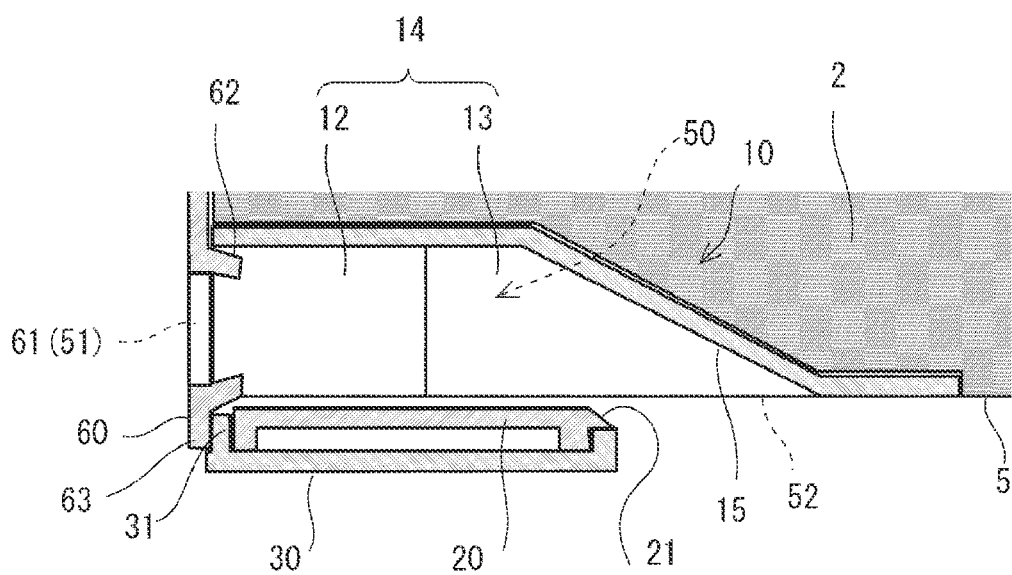
FIG. 5 is an A-A cross-sectional view showing the air guide path structure in FIG. 4.

FIG. 5 is an A-A schematic cross-sectional view showing the air guide path structure in FIG. 4.

The inner member 10, the outer member 20, and the cover member 30 that serve as the air guide path forming member in FIG. 3 are stacked in this order in a vertically long recessed portion formed in a side surface portion of the vehicle body 2 at a rear side of the wheel house 7.

As a result, a vertically long air guide path 50 is formed in a side surface portion at the rear side of the wheel house 7. The air guide path 50 is formed between the inner member 10 and the outer member 20.

An introduction port 51 of the air guide path 50 is formed to be vertically long along an outer edge of the wheel house 7.

As shown in FIG. 2, the introduction port 51 of the vertically long air guide path 50 is formed in a range from a lower side of an axle center of the wheel house 7 to an upper side of the axle center.

A width of the air guide path 50 is defined by a height of the plurality of partition members 14 in the vehicle width direction. The width of the air guide path 50 is substantially uniform.

As shown in FIG. 3, the plurality (three or more) of partition members 14 are erected on the outer surface of the inner substrate portion 11. The vertically long air guide path 50 is formed in a manner of being divided into a plurality of sections in a vertical direction.

The inclined portion 12 that is lowered forward and downward toward the introduction port 51 of the partition member 14 in the air guide path 50 may be formed as, for example, a rising surface with an ascending slope of 45 degrees as shown in FIG. 2 or 3.

An outlet port 52 is formed in a side surface portion of the vehicle body 2 at a rear side of the air guide path 50 formed by the air guide path forming member.

The vertically long inclined surface 15 inclined outward in the vehicle width direction and a rear end portion of the flat portion 13 of the partition member 14 are exposed at the outlet port 52. The flat portion 13 of the partition member 14 protrudes to a rear side from the vertically long air guide path 50.

The partition member 14 protrudes to a rear side from the vertically long air guide path 50 and partitions the vertically long inclined surface 15 so as to form a plurality of sections.

The vertically long inclined surface 15 may be formed at an angle of, for example, 45 degrees or more and 60 degrees or less, so that an airflow that passed through the vertically long air guide path 50 flows in a rearward and outward direction.

A facing inclined surface 21 that faces the vertically long inclined surface 15 is formed at a rear end edge portion of the outer member 20. The facing inclined surface 21 is formed into a flat surface or a curved surface following a surface shape of the vertically long inclined surface 15.

A vertically long rib portion 31 is provided at a front edge of the cover member 30 where the wheel house 7 is present. The vertically long rib portion 31 of the cover member 30 overlaps a front side of the outer member 20.

A wheel house member 60 that forms the wheel house 7 covers front sides of the inner member 10, the outer member 20, and the cover member 30 that serve as the air guide path forming member.

The wheel house member 60 is located at a front side of the vertically long rib portion 31 of the cover member 30. The vertically long rib portion 31 of the cover member 30 is interposed between the wheel house member 60 and the outer member 20.

A through hole 61 and a funnel portion are formed in the wheel house member 60 that forms the wheel house 7.

The through hole 61 is formed in a portion of the wheel house member 60 that overlaps with the introduction port 51 of the air guide path 50.

The funnel portion is formed on the outer surface of the wheel house member 60 in a manner of erecting all round along a peripheral edge of the through hole 61.

The funnel portion is inserted into the introduction port 51 of the air guide path 50 formed between the inner member 10 and the outer member 20.

Accordingly, the inner member 10, the outer member 20, and the cover member 30 that serve as the air guide path forming member are covered by the wheel house member 60 and are not directly exposed relative to the wheel house 7.

The vertically long rib portion 31 of the cover member 30 is interposed between the wheel house member 60 and the inner member 10.

With such an overlapping structure, even when a very high air pressure or the like acts on these members, it is less likely to cause an opening between the inner member 10 and the outer member 20 or between the outer member 20 and the cover member 30. Deformation of the inner member 10, the outer member 20, and the cover member 30 can be prevented.

Figure 6:
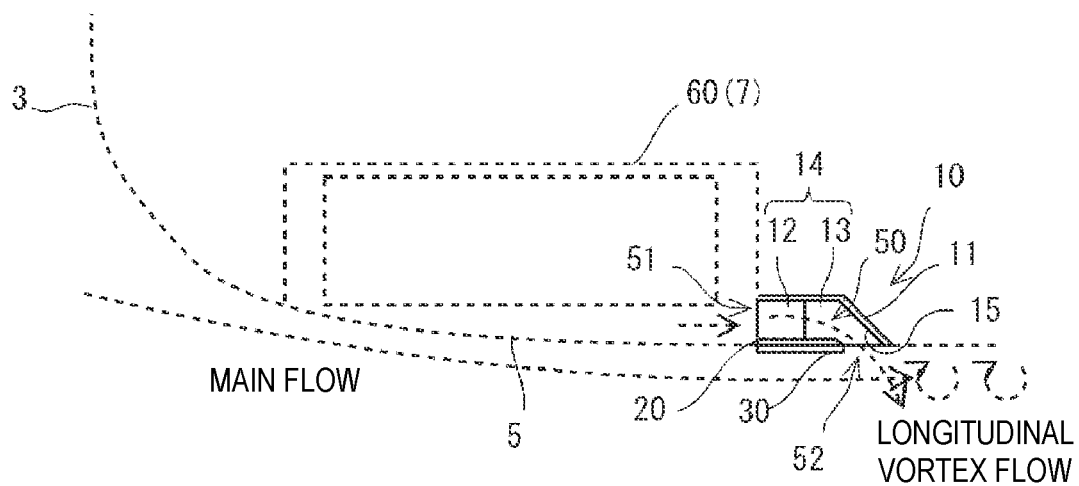
FIG. 6 is a view showing an airflow of the air guide path structure in FIG. 4.

FIG. 6 is a view showing an airflow of the air guide path structure in FIG. 4.

In FIG. 6, the air guide path structure in FIG. 4 is shown by a cross section taken along a line A-A.

Air that entered the wheel house 7 flows to the side surfaces 4 and 5 of the vehicle body 2 through the through hole 61 of the wheel house member 60, the introduction port 51, the air guide path 50, and the outlet port 52. Accordingly, the air resistance during traveling can be reduced.

The vertically long air guide path 50 is divided into a plurality of sections in the vertical direction by the plurality of partition members 14. An airflow is divided into a plurality of sections in the vertical direction.

The air guide path 50 is provided with the inclined portion 12 that is lowered forward and downward toward the introduction port 51. An airflow in each section flows through the air guide path 50 while being raised through the inclined portion 12. A vortex flow can be formed by the airflow of each section.

The outlet port 52 from the air guide path 50 is provided with the vertically long inclined surface 15 that is inclined outward in the vehicle width direction. An airflow flowing out from the air guide path 50 flows in a manner of being smoothly pushed outward in the vehicle width direction by the vertically long inclined surface 15.

The plurality of partition members 14 are also divided into a plurality of sections in the vertical direction at the outlet port 52. An airflow flowing out from the air guide path 50 flows out to the side surfaces 4 and 5 of the vehicle body 2 while maintaining an airflow state for each section.

Such an airflow flows out to the side surfaces 4 and 5 of the vehicle body 2, so that a longitudinal vortex flow is likely to be generated at a rear side of the air guide path forming member. An airflow (main flow) flowing from a front side to a rear side of the vehicle body 2 interflows with an airflow flowing out for each section, so that a longitudinal vortex flow is likely to be generated.

Figure 7:
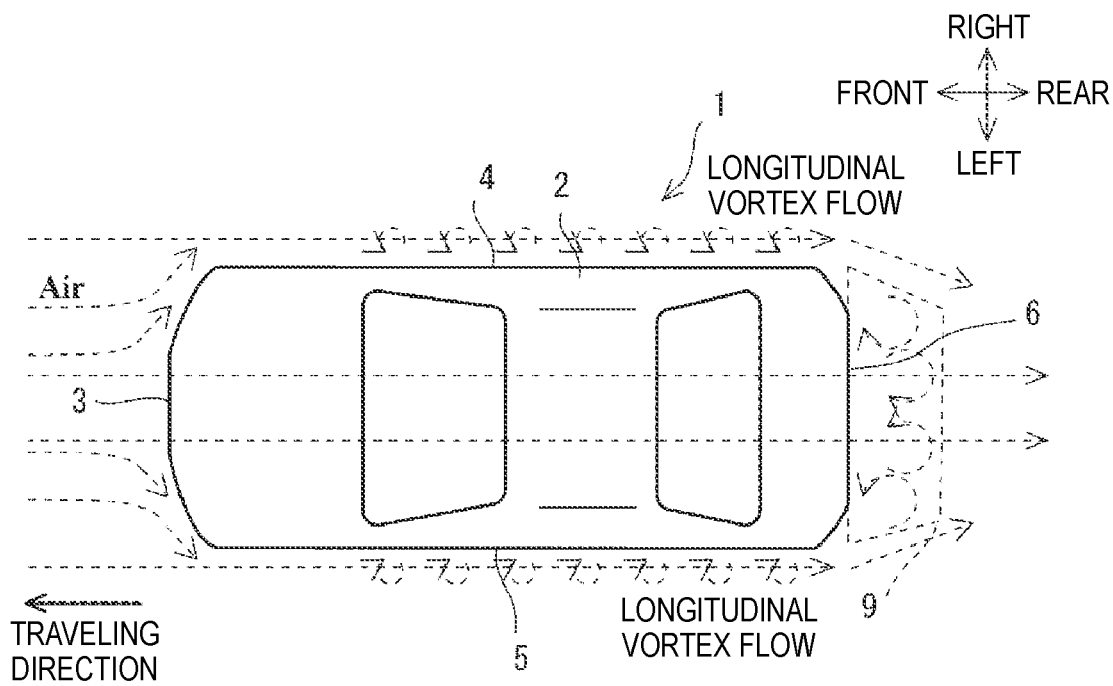
FIG. 7 is a view showing all airflows in an automobile having the air guide path structure in FIG. 4.

FIG. 7 is a view showing all airflows in the automobile 1 having the air guide path structure in FIG. 4.

In FIG. 7, the automobile 1 is shown in a plan view as in FIG. 1A.

As shown in FIG. 7, longitudinal vortex flows are generated on the left and right side surfaces 4 and 5 of the vehicle body 2. Airflows accompanying with the longitudinal vortex flows flow from the front side to the rear side of the vehicle body 2 along the left and right side surfaces 4 and 5 of the vehicle body 2.

As a result, a vortex flow generation range 9 in which vortex flows are generated at the rear side of the vehicle body 2 is narrower and smaller than that in FIG. 1A.

Accordingly, the air resistance during traveling can be reduced in the present embodiment.

In the present embodiment, it is possible to improve the steering stability performance and other performance desired for the automobile 1 by preventing, for example, wobbling and flapping of the automobile 1.

As described above, in the present embodiment, the vertically long air guide path forming member including the inner member 10, the outer member 20, and the cover member 30 is provided along an outer edge of the side surface portion of the vehicle body 2 that is the rear side of the wheel house 7, and the vertically long air guide path 50 is formed at the rear side of the wheel house 7 by the vertically long air guide path forming member. Accordingly, air that entered the wheel house 7 can be efficiently exhausted to a rear side.

In the present embodiment, the vertically long air guide path 50 is provided with the partition member 14 that partitions the air guide path 50 in the upper-lower direction. The partition member 14 partitions the air guide path 50 in the upper-lower direction so as to form a plurality of sections in the vertically long air guide path 50.

In the present embodiment, the vertically long inclined surface 15 is formed at the side surface portion of the vehicle body 2 at a rear side of the air guide path forming member. The partition member 14 protrudes to a rear side from the vertically long air guide path 50, and forms a plurality of sections not only in the air guide path 50 but also in the vertically long inclined surface 15.

An airflow that passes through the vertically long air guide path 50 for each section partitioned by the partition member 14 can be maintained as a flow for each section even when the airflow flows along the inclination of the vertically long inclined surface 15, and the airflow can interflow with a main airflow flowing from the front side to the rear side along the side surfaces 4 and 5 of the vehicle body 2 without disturbing the flow for each section. Since the airflow that passes through the vertically long air guide path 50 interflows with the main airflow while being maintained as a flow for each section, a longitudinal vortex flow is likely to be generated in an airflow flowing to a rear side along the side surfaces 4 and 5 of the vehicle body 2.

Since it is considered that a velocity of the airflow that passes through the air guide path 50 is basically slower than a velocity of the airflow flowing along the side surfaces 4 and 5 of the vehicle body 2, a longitudinal vortex flow is likely to be generated in the interflowed airflow flowing toward the rear side along the side surfaces 4 and 5 of the vehicle body 2 due to the velocity difference. In the present embodiment, the longitudinal vortex flow is likely to be generated at a high probability.

In particular, in the present embodiment, the partition member 14 that partitions the vertically long air guide path 50 into sections includes the flat portion 13 extending along the front-rear direction of the vehicle body 2 and the inclined portion 12 that is lowered forward and downward toward the introduction port 51 of the air guide path 50. Accordingly, an airflow that passes through the vertically long air guide path 50 for each section partitioned by the partition member 14 is likely to generate a vortex flow for each section when the airflow is raised and flows along the inclined portion 12. As a result, when the airflow that passes through the vertically long air guide path 50 for each section partitioned by the partition member 14 interflows with the main airflow, a longitudinal vortex flow may be generated at a high probability.

In this manner, since the longitudinal vortex flow is generated in the airflow that flows to a rear side along the side surfaces 4 and 5 of the vehicle body 2, it is possible to prevent a pressure fluctuation at the rear side of the vehicle body 2, and it is possible to reduce the vortex flow generation range 9 in which a vortex flow is generated at the rear side of the vehicle body 2.

As a result, it is possible to reduce the air resistance during traveling, it is possible to prevent the occurrence of a situation that affects the steering stability performance, such as wobbling and flapping of the automobile 1, and it is possible to improve the steering stability performance in the present embodiment.

On the other hand, for example, in a case where the partition member 14 is not provided in the vertically long air guide path 50, an airflow exhausted from the air guide path 50 is maintained in an airflow state in the wheel house 7 in which the airflow is introduced into the air guide path 50. Even when an airflow having a wide width in the upper-lower direction based on the airflow state in the wheel house 7 interflows with an airflow that flows to a rear side along the side surfaces 4 and 5 of the vehicle body 2 on the side surfaces 4 and 5 of the vehicle body 2, it is not always possible to generate a longitudinal vortex at a high probability only by a velocity difference between the airflows.

As a result, it cannot be expected that a longitudinal vortex is generated at a high probability. It cannot be expected the effect of preventing the occurrence of a situation that affects the steering stability performance, such as wobbling and flapping of the automobile 1, can be obtained at a high probability. It cannot be expected that the steering stability performance can be improved at a high probability.

The embodiment described above is an example of a preferred embodiment of the present invention, the present invention is not limited thereto, and various modifications or changes can be made without departing from the gist of the invention.

What is claimed is:

1. A vehicle air guide path structure in which a vertically long air guide path forming member is provided to be vertically long along an outer edge of a side surface portion of a vehicle body of a vehicle on a rear side of a wheel house of the vehicle, a vertically long air guide path is formed by the vertically long air guide path forming member at the rear side of the wheel house, and the vertically long air guide path is configured to suction air from the wheel house and exhaust air along a side surface of the vehicle body, the vehicle air guide path structure comprising:

a partition member that partitions the vertically long air guide path so as to form a plurality of sections in an upper-lower direction, wherein a vertically long inclined surface is formed on the side surface portion of the vehicle body at a rear side of the vertically long air guide path, and wherein the partition member protrudes to a rear side from the vertically long air guide path, wherein the partition member includes:

an inclined portion that is lowered forward toward an introduction port of the vertically long air guide path; and a flat portion that extends from a rear end of the inclined portion along a front-rear direction of the vehicle body.

2. The vehicle air guide path structure according to claim 1, wherein the flat portion protrudes to a rear side from the vertically long air guide path.

3. The vehicle air guide path structure according to claim 2, wherein the vertically long air guide path forming member includes:

an inner member located at an inner side of the vertically long air guide path in a vehicle width direction of the vehicle; and an outer member located at an outer side of the vertically long air guide path in the vehicle width direction, wherein a facing inclined surface that follows the vertically long inclined surface is formed on a rear end edge portion of the outer member.

4. The vehicle air guide path structure according to claim 3, wherein a wheel house member that forms the wheel house includes:

a through hole formed in a portion overlapping an introduction port of the vertically long air guide path; and a funnel portion erected along a peripheral edge of the through hole, and wherein the funnel portion is provided in a state in which the funnel portion enters the introduction port.

5. The vehicle air guide path structure according to claim 3, wherein the vertically long air guide path is formed from a lower side of an axle center of the wheel house to an upper side of the axle center.

6. The vehicle air guide path structure according to claim 3, wherein the partition member that partitions the vertically long air guide path into sections includes the flat portion extending along a front-rear direction of the vehicle body and the inclined portion that is lowered forward and downward toward an introduction port of an air guide path, the vertically long air guide path is provided at the side surface portion of the vehicle body that is the rear side of the wheel house.

7. The vehicle air guide path structure according to claim 3, wherein the vertically long inclined surface inclined outward in a vehicle width direction and a rear end portion of the flat portion of the partition member are exposed at an outlet port, wherein the flat portion of the partition member protrudes to a rear side of the vehicle from the vertically long air guide path.

8. The vehicle air guide path structure according to claim 3, wherein the vertically long inclined surface is formed at a predetermined angle to provide an airflow that passed through the vertically long air guide path flows in a rearward and outward direction.

9. The vehicle air guide path structure according to claim 3, wherein a surface from the inclined portion to the flat portion is continuously formed on the partition member, wherein the partition member that partitions the vertically long air guide path into sections includes the flat portion extending along a front-rear direction of the vehicle body and the inclined portion that is lowered forward and downward toward an introduction port of an air guide path.

10. The vehicle air guide path structure according to claim 2, wherein a wheel house member that forms the wheel house includes:

a through hole formed in a portion overlapping an introduction port of the vertically long air guide path; and a funnel portion erected along a peripheral edge of the through hole, and wherein the funnel portion is provided in a state in which the funnel portion enters the introduction port.

11. The vehicle air guide path structure according to claim 2, wherein the vertically long air guide path is formed from a lower side of an axle center of the wheel house to an upper side of the axle center.

12. The vehicle air guide path structure according to claim 1, wherein the vertically long air guide path forming member includes:

an inner member located at an inner side of the vertically long air guide path in a vehicle width direction of the vehicle; and an outer member located at an outer side of the vertically long air guide path in the vehicle width direction, and wherein a facing inclined surface that follows the vertically long inclined surface is formed on a rear end edge portion of the outer member.

13. The vehicle air guide path structure according to claim 12, wherein a wheel house member that forms the wheel house includes:

a through hole formed in a portion overlapping an introduction port of the vertically long air guide path; and a funnel portion erected along a peripheral edge of the through hole, and wherein the funnel portion is provided in a state in which the funnel portion enters the introduction port.

14. The vehicle air guide path structure according to claim 12, wherein the vertically long air guide path is formed from a lower side of an axle center of the wheel house to an upper side of the axle center.

15. The vehicle air guide path structure according to claim 1, wherein a wheel house member that forms the wheel house includes:

a through hole formed in a portion overlapping an introduction port of the vertically long air guide path; and a funnel portion erected along a peripheral edge of the through hole, and wherein the funnel portion is provided in a state in which the funnel portion enters the introduction port.

16. The vehicle air guide path structure according to claim 1, wherein the vertically long air guide path is formed from a lower side of an axle center of the wheel house to an upper side of the axle center.

17. The vehicle comprising the vehicle air guide path structure according to claim 1.

18. The vehicle air guide path structure according to claim 1, wherein the vertically long air guide path is formed from a lower side of an axle center of the wheel house to an upper side of the axle center.

19. An air guide path forming member to be provided vertically long along an outer edge of a side surface portion of a vehicle body of a vehicle in a rear side of a wheel house of the vehicle, the air guide path forming member comprising:

a vertically long air guide path that is formed at the rear side of the wheel house, the vertically long air guide path being configured to suction air from the wheel house and exhaust air along a side surface of the vehicle body;

a partition member that partitions the vertically long air guide path so as to form a plurality of sections in an upper-lower direction, wherein a vertically long inclined surface is formed on the side surface portion of the vehicle body at a rear side of the vertically long air guide path, and wherein the partition member protrudes to a rear side from the vertically long air guide path;

an inner member located at an inner side of the vertically long air guide path in a vehicle width direction of the vehicle; and an outer member located at an outer side of the vertically long air guide path in the vehicle width direction,
wherein a facing inclined surface that follows the vertically long inclined surface is formed on a rear end edge portion of the outer member, and
wherein the inner member includes the vertically long inclined surface along part of the inner member at the rear side of the vertically long air guide path.

20. The vehicle comprising the air guide path forming member according to claim 19.

* * * * *